US 8,644,475 B1

(12) United States Patent
Yoakum et al.

(10) Patent No.: US 8,644,475 B1
(45) Date of Patent: Feb. 4, 2014

(54) TELEPHONY USAGE DERIVED PRESENCE INFORMATION

(75) Inventors: John H. Yoakum, Cary, NC (US); Samuel H. Christie, IV, Cary, NC (US); Steve J. McKinnon, Cary, NC (US)

(73) Assignee: Rockstar Consortium US LP, Plano, TX (US)

( * ) Notice: Subject to any disclaimer, the term of this patent is extended or adjusted under 35 U.S.C. 154(b) by 2581 days.

(21) Appl. No.: 10/079,237

(22) Filed: Feb. 20, 2002

Related U.S. Application Data

(60) Provisional application No. 60/329,668, filed on Oct. 16, 2001.

(51) Int. Cl.
*H04M 3/42* (2006.01)
*H04M 15/00* (2006.01)
*H04L 12/66* (2006.01)

(52) U.S. Cl.
USPC ................ 379/201.1; 379/111; 379/112.06; 379/207.04; 370/352

(58) Field of Classification Search
USPC ............ 379/201.06, 201.07, 201.08, 201.01, 379/207.04, 207.05, 207.06, 207.07, 379/207.12, 93.01, 211.01, 157, 201.1, 111, 379/112.06, 112.07; 370/352, 356, 912; 455/418, 414.1; 709/204, 224
See application file for complete search history.

(56) References Cited

U.S. PATENT DOCUMENTS

| 4,932,050 A | 6/1990 | Davidson et al. ............. 379/211 |
| 5,185,782 A | 2/1993 | Srinivasan ...................... 379/67 |
| 5,243,645 A * | 9/1993 | Bissell et al. ............ 379/211.02 |
| 5,315,636 A | 5/1994 | Patel ................................ 379/58 |
| 5,327,521 A | 7/1994 | Savic et al. |
| 5,347,306 A | 9/1994 | Nitta |
| 5,353,335 A | 10/1994 | D'Urso et al. |
| 5,414,759 A | 5/1995 | Ishikuri et al. ................. 379/88 |
| 5,450,613 A | 9/1995 | Takahara et al. ............ 455/54.1 |
| 5,541,981 A | 7/1996 | Lynn |

(Continued)

FOREIGN PATENT DOCUMENTS

| EP | 1071295 A2 | 1/2001 |
| EP | 1 148 688 A1 | 10/2001 |

(Continued)

OTHER PUBLICATIONS

International Search Report for related application PCT/US02/40882, mailed Oct. 8, 2003.

(Continued)

*Primary Examiner* — Thjuan K Addy
(74) *Attorney, Agent, or Firm* — Withrow & Terranova, PLLC

(57) ABSTRACT

The present invention relates to a mechanism for providing state information, which bears on the presence of a telephone user, to a presence system. The state information is derived by monitoring events relating to telephony use. Once derived, the state information is directly or indirectly sent to a presence service, which provides presence information to applications requiring such information about the telephone user. The state information preferably bears on the presence, absence, or availability of the telephone user based on their interaction with a telephony device or function. In one embodiment, a telephony switching system is configured to monitor events associated with a telephony device or function and send messages to a presence service over a packet-switched network when the state of the telephony device or function changes. In another embodiment, an IP telephone system is configured to provide state information to the presence service.

31 Claims, 3 Drawing Sheets

(56) References Cited

U.S. PATENT DOCUMENTS

| | | | |
|---|---|---|---|
| 5,550,907 A | 8/1996 | Carlsen | 379/207 |
| 5,555,376 A | 9/1996 | Theimer et al. | 395/200.09 |
| 5,586,171 A | 12/1996 | McAllister et al. | |
| 5,596,633 A | 1/1997 | Meier et al. | 379/201 |
| 5,633,921 A * | 5/1997 | Soderberg | 379/207.04 |
| 5,633,924 A | 5/1997 | Kaish et al. | 379/266 |
| 5,652,789 A | 7/1997 | Miner et al. | |
| 5,742,905 A | 4/1998 | Pepe et al. | 455/461 |
| 5,749,073 A | 5/1998 | Slaney | |
| 5,757,901 A | 5/1998 | Hiroshige | 379/212 |
| 5,771,280 A | 6/1998 | Johnson | 379/93.23 |
| 5,790,649 A | 8/1998 | Hiroshige | 379/201 |
| 5,812,126 A | 9/1998 | Richardson et al. | |
| 5,812,865 A | 9/1998 | Theimer et al. | 395/800 |
| 5,812,972 A | 9/1998 | Juang et al. | |
| 5,815,554 A | 9/1998 | Burgess et al. | 379/90.01 |
| 5,818,836 A | 10/1998 | DuVal | |
| 5,825,864 A | 10/1998 | McGraw et al. | 379/210 |
| 5,835,568 A | 11/1998 | Bass et al. | |
| 5,848,134 A | 12/1998 | Sekiguchi et al. | |
| 5,860,064 A | 1/1999 | Henton | |
| 5,864,848 A | 1/1999 | Horvitz et al. | |
| 5,870,709 A | 2/1999 | Bernstein | |
| 5,875,427 A | 2/1999 | Yamazaki | |
| 5,880,731 A | 3/1999 | Liles et al. | |
| 5,884,029 A | 3/1999 | Brush, II et al. | |
| 5,884,262 A | 3/1999 | Wise et al. | |
| 5,890,115 A | 3/1999 | Cole | |
| 5,901,359 A | 5/1999 | Malmstrom | |
| 5,911,129 A | 6/1999 | Towell | |
| 5,930,702 A | 7/1999 | Goldman et al. | 455/417 |
| 5,933,805 A | 8/1999 | Boss et al. | |
| 5,960,173 A | 9/1999 | Tang et al. | |
| 6,038,443 A | 3/2000 | Luneau | |
| 6,052,597 A | 4/2000 | Ekstrom | |
| 6,058,415 A | 5/2000 | Polcyn | 709/200 |
| 6,067,357 A | 5/2000 | Kishinsky et al. | 379/265 |
| 6,085,232 A | 7/2000 | Kikinis | |
| 6,104,913 A | 8/2000 | McAllister | 455/41 |
| 6,111,937 A | 8/2000 | Kuroiwa et al. | |
| 6,125,176 A | 9/2000 | Foladare et al. | 379/211 |
| 6,134,314 A | 10/2000 | Dougherty et al. | 379/207 |
| 6,141,356 A | 10/2000 | Gorman | 370/493 |
| 6,144,644 A * | 11/2000 | Bajzath et al. | 370/259 |
| 6,148,328 A | 11/2000 | Cuomo et al. | |
| 6,173,250 B1 | 1/2001 | Jong | |
| 6,173,262 B1 | 1/2001 | Hirschberg | |
| 6,175,616 B1 | 1/2001 | Light et al. | 379/88.14 |
| 6,185,292 B1 | 2/2001 | Miloslavsky | 379/265 |
| 6,215,858 B1 | 4/2001 | Bartholomew et al. | |
| 6,223,165 B1 | 4/2001 | Lauffer | 705/8 |
| 6,226,361 B1 | 5/2001 | Koyama | |
| 6,233,465 B1 | 5/2001 | Smith et al. | |
| 6,243,398 B1 | 6/2001 | Kahane et al. | 370/522 |
| 6,253,230 B1 | 6/2001 | Couland et al. | |
| 6,260,148 B1 | 7/2001 | Aggarwal et al. | 713/201 |
| 6,282,511 B1 | 8/2001 | Mayer | |
| 6,295,348 B1 * | 9/2001 | Bleile et al. | 379/199 |
| 6,301,609 B1 | 10/2001 | Aravamudan et al. | 709/207 |
| 6,314,094 B1 | 11/2001 | Boys | |
| 6,317,486 B1 | 11/2001 | Hollins et al. | |
| 6,330,322 B1 * | 12/2001 | Foladare et al. | 379/211.01 |
| 6,356,937 B1 | 3/2002 | Montville et al. | |
| 6,366,651 B1 | 4/2002 | Griffith et al. | |
| 6,366,886 B1 | 4/2002 | Dragosh et al. | |
| 6,377,944 B1 | 4/2002 | Busey et al. | 707/3 |
| 6,385,461 B1 | 5/2002 | Raith | |
| 6,389,114 B1 | 5/2002 | Dowens et al. | |
| 6,389,127 B1 | 5/2002 | Vardi et al. | 379/209.01 |
| 6,418,198 B2 | 7/2002 | Brablec et al. | 379/79 |
| 6,424,935 B1 | 7/2002 | Taylor | |
| 6,430,289 B1 | 8/2002 | Liffick | 379/900 |
| 6,430,395 B2 | 8/2002 | Arazi et al. | |
| 6,430,604 B1 | 8/2002 | Ogle et al. | |
| 6,434,599 B1 | 8/2002 | Porter | |
| 6,445,912 B1 | 9/2002 | Cole et al. | 455/406 |
| 6,446,076 B1 | 9/2002 | Burkey et al. | |
| 6,449,344 B1 | 9/2002 | Goldfinger et al. | 379/88.17 |
| 6,449,365 B1 | 9/2002 | Hodges et al. | |
| 6,453,294 B1 | 9/2002 | Dutta et al. | |
| 6,463,142 B1 | 10/2002 | Kilp | 379/201.06 |
| 6,463,471 B1 | 10/2002 | Dreke et al. | 709/224 |
| 6,480,593 B1 | 11/2002 | Munday et al. | 379/211.02 |
| 6,483,900 B1 | 11/2002 | Light et al. | 379/88.17 |
| 6,484,196 B1 | 11/2002 | Maurille | |
| 6,507,643 B1 | 1/2003 | Groner | |
| 6,519,639 B1 | 2/2003 | Glasser et al. | |
| 6,546,096 B1 * | 4/2003 | Meiden et al. | 379/209.01 |
| 6,549,937 B1 | 4/2003 | Auerbach et al. | |
| 6,560,648 B1 | 5/2003 | Dunn et al. | |
| 6,564,261 B1 | 5/2003 | Gudjonsson et al. | 709/227 |
| 6,584,494 B1 | 6/2003 | Manabe et al. | |
| 6,617,969 B2 | 9/2003 | Tu et al. | |
| 6,618,704 B2 | 9/2003 | Kanevsky et al. | |
| 6,618,710 B1 | 9/2003 | Zondervan et al. | |
| 6,633,636 B1 | 10/2003 | McConnell et al. | |
| 6,640,241 B1 | 10/2003 | Ozzie et al. | |
| 6,654,790 B2 | 11/2003 | Ogle et al. | |
| 6,658,095 B1 | 12/2003 | Yoakum et al. | 379/93.01 |
| 6,665,395 B1 | 12/2003 | Busey et al. | 379/265.09 |
| 6,678,719 B1 | 1/2004 | Stimmel | |
| 6,697,840 B1 | 2/2004 | Godefroid et al. | 709/205 |
| 6,700,966 B2 * | 3/2004 | Takagi et al. | 379/201.06 |
| 6,728,754 B1 | 4/2004 | Lipton | |
| 6,735,701 B1 | 5/2004 | Jacobson | 713/201 |
| 6,738,461 B2 | 5/2004 | Trandal et al. | 379/142.02 |
| 6,741,853 B1 * | 5/2004 | Jiang et al. | 455/418 |
| 6,799,209 B1 | 9/2004 | Hayton | |
| 6,807,423 B1 | 10/2004 | Armstrong et al. | 455/440 |
| 6,810,411 B1 | 10/2004 | Coughlin et al. | |
| 6,920,498 B1 | 7/2005 | Gourlay et al. | |
| 6,985,961 B1 | 1/2006 | Ramsayer et al. | |
| 7,020,480 B2 | 3/2006 | Coskun et al. | |
| 7,035,923 B1 | 4/2006 | Yoakum et al. | |
| 7,103,651 B2 | 9/2006 | Bohannon et al. | |
| 7,136,631 B1 * | 11/2006 | Jiang et al. | 455/414.1 |
| 7,212,617 B2 | 5/2007 | Owens et al. | |
| 7,269,162 B1 * | 9/2007 | Turner | 370/352 |
| 7,356,137 B1 * | 4/2008 | Burg et al. | 379/211.01 |
| 2001/0005412 A1 | 6/2001 | Light et al. | 379/88.13 |
| 2001/0039585 A1 | 11/2001 | Primak et al. | |
| 2001/0044299 A1 | 11/2001 | Sandegren | 455/422 |
| 2001/0053213 A1 | 12/2001 | Truong et al. | 379/202.01 |
| 2001/0053214 A1 | 12/2001 | Kleinoder et al. | 379/207.04 |
| 2002/0006803 A1 | 1/2002 | Mendiola et al. | 455/466 |
| 2002/0024947 A1 | 2/2002 | Luzzatti et al. | 370/352 |
| 2002/0032035 A1 | 3/2002 | Teshima | |
| 2002/0035605 A1 | 3/2002 | McDowell et al. | |
| 2002/0038360 A1 | 3/2002 | Andrews et al. | 709/223 |
| 2002/0049842 A1 | 4/2002 | Huetsch et al. | |
| 2002/0055975 A1 | 5/2002 | Petrovykh | 709/205 |
| 2002/0059622 A1 | 5/2002 | Grove et al. | 725/91 |
| 2002/0060988 A1 | 5/2002 | Shtivelman | 370/259 |
| 2002/0065894 A1 | 5/2002 | Dalal et al. | 709/206 |
| 2002/0076010 A1 | 6/2002 | Sahai | 379/88.19 |
| 2002/0078188 A1 | 6/2002 | Anand et al. | |
| 2002/0085516 A1 | 7/2002 | Bridgelall | |
| 2002/0101993 A1 | 8/2002 | Eskin | 380/270 |
| 2002/0102993 A1 | 8/2002 | Hendrey et al. | |
| 2002/0111173 A1 | 8/2002 | Hendrey et al. | |
| 2002/0114432 A1 | 8/2002 | Shaffer et al. | 379/90.01 |
| 2002/0116336 A1 | 8/2002 | Diacakis et al. | 705/51 |
| 2002/0116461 A1 | 8/2002 | Diacakis et al. | 709/204 |
| 2002/0120687 A1 | 8/2002 | Diacakis et al. | 709/204 |
| 2002/0126701 A1 | 9/2002 | Requena | 370/469 |
| 2002/0131395 A1 | 9/2002 | Wang | |
| 2002/0143876 A1 | 10/2002 | Boyer et al. | 709/205 |
| 2002/0143877 A1 | 10/2002 | Hackbarth et al. | 709/205 |
| 2002/0147008 A1 | 10/2002 | Kallio | |
| 2002/0147777 A1 | 10/2002 | Hackbarth et al. | 709/205 |
| 2002/0147814 A1 | 10/2002 | Kimchi et al. | 709/226 |
| 2002/0163572 A1 | 11/2002 | Center, Jr. et al. | 348/14.08 |
| 2002/0165000 A1 | 11/2002 | Fok | |
| 2002/0181693 A1 | 12/2002 | Ribera | 379/265.09 |

(56) References Cited

U.S. PATENT DOCUMENTS

| | | |
|---|---|---|
| 2002/0194335 A1 | 12/2002 | Maynard |
| 2002/0196770 A1 | 12/2002 | Lin |
| 2003/0004762 A1 | 1/2003 | Banerjee et al. ............... 705/5 |
| 2003/0018704 A1 | 1/2003 | Polychronidis et al. ...... 709/202 |
| 2003/0023623 A1 | 1/2003 | Horvitz et al. |
| 2003/0023681 A1 | 1/2003 | Brown et al. ............... 709/204 |
| 2003/0026289 A1 | 2/2003 | Mukherjee et al. ........... 370/466 |
| 2003/0028621 A1 | 2/2003 | Furlong et al. |
| 2003/0035529 A1 | 2/2003 | Baker ............... 379/211.02 |
| 2003/0037103 A1 | 2/2003 | Salmi et al. |
| 2003/0037113 A1 | 2/2003 | Petrovykh ............... 709/205 |
| 2003/0041101 A1 | 2/2003 | Hansche et al. ............ 709/203 |
| 2003/0048195 A1 | 3/2003 | Trossen ............... 340/825.49 |
| 2003/0052915 A1 | 3/2003 | Brown et al. ............... 345/752 |
| 2003/0055897 A1 | 3/2003 | Brown et al. ............... 709/205 |
| 2003/0059029 A1 | 3/2003 | Mengshoel et al. ...... 379/265.02 |
| 2003/0065721 A1 | 4/2003 | Roskind ............... 709/204 |
| 2003/0065788 A1 | 4/2003 | Salomaki ............... 709/227 |
| 2003/0069934 A1 | 4/2003 | Garcia-Martin et al. |
| 2003/0073440 A1 | 4/2003 | Mukherjee et al. ........... 455/435 |
| 2003/0078979 A1 | 4/2003 | Sagi |
| 2003/0093482 A1 | 5/2003 | Watanabe et al. |
| 2003/0101278 A1 | 5/2003 | Garcia-Luna-Aceves et al. |
| 2003/0104819 A1 | 6/2003 | Knauerhase et al. |
| 2003/0105820 A1 | 6/2003 | Haims et al. ............... 709/205 |
| 2003/0129972 A1 | 7/2003 | Tosaki et al. ............... 455/414 |
| 2003/0134638 A1 | 7/2003 | Sundar et al. |
| 2003/0135624 A1 | 7/2003 | McKinnon et al. ........... 709/228 |
| 2003/0154293 A1 | 8/2003 | Zmolek ............... 709/228 |
| 2003/0174814 A1 | 9/2003 | Diacakis ............... 379/80 |
| 2003/0206619 A1 | 11/2003 | Curbow et al. ........ 379/210.01 |
| 2003/0217099 A1 | 11/2003 | Bobde et al. |
| 2003/0217142 A1 | 11/2003 | Bobde et al. |
| 2003/0225848 A1 | 12/2003 | Heikes et al. |
| 2003/0229722 A1 | 12/2003 | Beyda |
| 2003/0233537 A1 | 12/2003 | Wohlgemuth et al. |
| 2003/0235287 A1 | 12/2003 | Margolis ............... 379/265.01 |
| 2004/0037271 A1 | 2/2004 | Liscano et al. ............... 370/352 |
| 2004/0044647 A1 | 3/2004 | Salmenkaita ............... 707/1 |
| 2004/0059781 A1 | 3/2004 | Yoakum et al. |
| 2004/0072593 A1 | 4/2004 | Robbins et al. |
| 2004/0073614 A1 | 4/2004 | Blohm |
| 2004/0122810 A1 | 6/2004 | Mayer ............... 707/3 |
| 2004/0122901 A1 | 6/2004 | Sylvain |
| 2004/0125941 A1 | 7/2004 | Yoakum |
| 2004/0153506 A1 | 8/2004 | Ito et al. ............... 709/204 |
| 2004/0172528 A1 | 9/2004 | Tenereillo |
| 2004/0174966 A1 | 9/2004 | Koch ............... 379/88.22 |
| 2004/0177278 A1 | 9/2004 | Lipton |
| 2004/0203746 A1 | 10/2004 | Knauerhase et al. |
| 2004/0203927 A1 | 10/2004 | Kraft |
| 2004/0249776 A1 | 12/2004 | Horvitz et al. ............... 706/21 |
| 2005/0041580 A1 | 2/2005 | Petrovykh |
| 2005/0044144 A1 | 2/2005 | Malik et al. |
| 2005/0074101 A1 | 4/2005 | Moore et al. ............ 379/114.01 |
| 2005/0086211 A1 | 4/2005 | Mayer |
| 2005/0117570 A1 | 6/2005 | Cetusic et al. ............... 370/352 |
| 2005/0159153 A1 | 7/2005 | Mousseau et al. |
| 2005/0172011 A1 | 8/2005 | Gourlay et al. |
| 2006/0003766 A1 | 1/2006 | Parameswar et al. |
| 2006/0078101 A1* | 4/2006 | Light et al. ............... 379/157 |
| 2007/0189489 A1 | 8/2007 | Carnazza et al. |

FOREIGN PATENT DOCUMENTS

| | | |
|---|---|---|
| EP | 1 225 752 A2 | 7/2002 |
| EP | 1 329 810 A1 | 7/2003 |
| EP | 1459508 A1 | 9/2004 |
| WO | 99/17194 | 4/1999 |
| WO | WO 99/34628 | 7/1999 |
| WO | 02095630 A1 | 11/2002 |
| WO | 03056799 A1 | 7/2003 |
| WO | 03058921 A2 | 7/2003 |
| WO | 2004028114 A2 | 4/2004 |
| WO | 2004057816 A1 | 7/2004 |
| WO | 2007045947 A1 | 4/2007 |

OTHER PUBLICATIONS

PCT International Search Report for PCT/IB03/04250, mailed Jan. 19, 2004.

PCT International Search Report for PCT/IB03/03962, mailed Jan. 28, 2004.

Eschenburg, Axel, "Wo Laufen Sie Denn? ICQ Haelt Verbindung Zu Bekannten," CT Magazin Fuer Computer Technik, Verlag Heinz Heise GMBH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

Day, M. et al., "A Model for Presence and Instant Messaging," IETF REquest for Comments, XX, XX, No. 2778, Feb. 2000, pp. 1-17.

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for PCT/IB03/06073, mailed May 4, 2004.

Brodsky, Alexander et al., "Resource Management in Agent-based Distributed Environments," Proceedings of the 1999 International Symposium on Kyoto, Japan Nov. 28-30, 1999, pp. 95-108, XP010379697.

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Krauter, Klaus, et al., "A Taxonomy and Survey of Grid Resource Management Systems for Distributed Computing," Software Practice & Experience, John Wiley & Sons Ltd., Chichester, Great Britain, vol. 32, No. 2, Feb. 2, 2002, pp. 135-164, XP001091827.

International Search Report for PCT/IB303/05780 mailed Jan. 27, 2005.

Day, M. and Rosenberg, J., "Request for Comments (RFC) 2778: A Model for Presence and Instant Messaging," IETF—Network Working Group, Information Memo, Feb. 2000, XP002201444.

Rosenberg, J. and Schulzrinne, H., "draft-rosenberg-sip-pip.00.txt: SIP for Presence," IETF Internet Draft, Nov. 13, 1998, pp. 1-22, XP002325320.

European Search Report for 03257957.5, mailed Aug. 24, 2005.

International Search Report for PCT/IB02/05523 mailed Apr. 15, 2003.

International Search Report for PCT/IB03/03994 mailed Mar. 30, 2004.

Crocker, D. et al., "A Common Profile for Instant Messaging (CPIM)," (work in progress), Feb. 2001, 75 pages, The Internet Society.

Day et al., "Instant Messaging/Presence Protocol Requirements," Request for Comment (RFC) 2779, Feb. 2000, 53 pages, The Internet Society.

Handley, M. et al., "SIP: Session Initiation Protocol," Request for Comments (RFC) 2543: Session Initiated Protocol Internet Draft, Mar. 1999, 153 pages, The Internet Society.

Rivera, Krisela et al., "The Effect of Emotional Icons On Remote Communications," CHI 96 Interactive Posters, New Mexico State University Department of Psychology, Las Cruces, NM, Apr. 13-18, 1996, pp. 99-100.

Advisory Action for U.S. Appl. No. 10/034,431, mailed Nov. 22, 2005, 3 pages.

Examiner's Answer to Appeal Brief for U.S. Appl. No. 10/034,431, mailed Aug. 23, 2007, 13 pages.

Examiner's Answer to Appeal Brief for U.S. Appl. No. 10/034,431, mailed Jun. 16, 2006, 11 pages.

Examiner's Answer to Appeal Brief for U.S. Appl. No. 10/034,431, mailed Mar. 17, 2010, 13 pages.

(56) References Cited

OTHER PUBLICATIONS

Final Office Action for U.S. Appl. No. 10/034,431, mailed Sep. 6, 2005, 9 pages.
Non-Final Office Action for U.S. Appl. No. 10/034,431, mailed Mar. 1, 2005, 9 pages.
Advisory Action for U.S. Appl. No. 10/034,429, mailed Aug. 6, 2007, 3 pages.
Advisory Action for U.S. Appl. No. 10/034,429, mailed Jan. 3, 2006, 3 pages.
Advisory Action for U.S. Appl. No. 10/034,429, mailed Oct. 8, 2008, 3 pages.
Final Office Action for U.S. Appl. No. 10/034,429, mailed Jul. 25, 2008, 12 pages.
Final Office Action for U.S. Appl. No. 10/034,429, mailed Jun. 29, 2009, 13 pages.
Final Office Action for U.S. Appl. No. 10/034,429, mailed May 15, 2007, 13 pages.
Final Office Action for U.S. Appl. No. 10/034,429, mailed Oct. 20, 2005, 13 pages.
Non-Final Office Action for U.S. Appl. No. 10/034,429, mailed Apr. 24, 2006, 12 pages.
Non-Final Office Action for U.S. Appl. No. 10/034,429, mailed Apr. 27, 2005, 11 pages.
Non-Final Office Action for U.S. Appl. No. 10/034,429, mailed Nov. 13, 2008, 11 pages.
Non-Final Office Action for U.S. Appl. No. 10/034,429, mailed Nov. 16, 2006, 12 pages.
Non-Final Office Action for U.S. Appl. No. 10/034,429, mailed Sep. 7, 2007, 10 pages.
Advisory Action for U.S. Appl. No. 10/036,247 (now US patent 7,299,286), mailed Dec. 27, 2005, 3 pages.
Final Office Action for U.S. Appl. No. 10/036,247 (now US patent 7,299,286), mailed Aug. 25, 2005, 15 pages.
Non-Final Office Action for U.S. Appl. No. 10/036,247 (now US patent 7,299,286), mailed Apr. 28, 2005, 13 pages.
Non-Final Office Action for U.S. Appl. No. 10/036,247 (now US patent 7,299,286), mailed Nov. 1, 2006, 5 pages.
Notice of Allowance for U.S. Appl. No. 10/036,247 (now US patent 7,299,286), mailed Jul. 12, 2007, 4 pages.
Advisory Action for U.S. Appl. No. 10/100,703 (now US patent 7,227,937), mailed Apr. 1, 2005, 3 pages.
Advisory Action for U.S. Appl. No. 10/100,703 (now US patent 7,227,937), mailed Jan. 19, 2006, 3 pages.
Final Office Action for U.S. Appl. No. 10/100,703 (now US patent 7,227,937), mailed Jan. 14, 2005, 4 pages.
Final Office Action for U.S. Appl. No. 10/100,703 (now US patent 7,227,937), mailed Oct. 19, 2005, 5 pages.
Non-Final Office Action for U.S. Appl. No. 10/100,703 (now US patent 7,227,937), mailed Jun. 29, 2006, 5 pages.
Non-Final Office Action for U.S. Appl. No. 10/100,703 (now US patent 7,227,937), mailed May 20, 2004, 4 pages.
Non-Final Office Action for U.S. Appl. No. 10/100,703 (now US patent 7,227,937), mailed May 6, 2005, 5 pages.
Notice of Allowance for U.S. Appl. No. 10/100,703 (now US patent 7,227,937), mailed Jan. 17, 2007, 4 pages.
Supplemental Notice of Allowability for U.S. Appl. No. 10/100,703 (now US patent 7,227,937), mailed Apr. 12, 2007, 2 pages.
Supplemental Notice of Allowability for U.S. Appl. No. 10/100,703, (now US patent 7,227,937) mailed Feb. 28, 2007, 2 pages.
Notice of Allowance for U.S. Appl. No. 10/101,286, mailed Aug. 11, 2003, 4 pages.
Advisory Action for U.S. Appl. No. 10/119,923, mailed Nov. 29, 2004, 3 pages.
Final Office Action for U.S. Appl. No. 10/119,923, mailed Sep. 13, 2004, 10 pages. (7000-143).
Non-Final Office Action for U.S. Appl. No. 10/119,923, mailed Feb. 23, 2005, 7 pages.
Non-Final Office Action for U.S. Appl. No. 10/119,923, mailed Feb. 6, 2004, 7 pages.
Notice of Allowance for U.S. Appl. No. 10/119,923, mailed Aug. 5, 2005, 7 pages.
Notice of Allowance for U.S. Appl. No. 10/119,923, mailed Jan. 12, 2006, 4 pages.
Supplemental Notice of Allowance for U.S. Appl. No. 10/119,923, mailed Jun. 16, 2006, 2 pages.
Supplemental Notice of Allowance for U.S. Appl. No. 10/119,923, mailed Mar. 8, 2006, 2 pages.
Advisory Action for U.S. Appl. No. 10/245,476, mailed Jan. 29, 2008, 3 pages.
Board of Patent Appeals and Interferences Decision concerning U.S. Appl. No. 10/245,476, mailed Oct. 18, 2011, 7 pages.
Examiner's Answer to Appeal for U.S. Appl. No. 10/245,476, mailed Jun. 11, 2008, 27 pages.
Final Office Action for U.S. Appl. No. 10/245,476, mailed Nov. 16, 2007, 25 pages.
Final Office Action for U.S. Appl. No. 10/245,476, mailed Oct. 20, 2006, 24 pages.
Non-Final Office Action for U.S. Appl. No. 10/245,476, mailed Jan. 12, 2007.
Non-Final Office Action for U.S. Appl. No. 10/245,476, mailed Jun. 21, 2007.
Non-Final Office Action for U.S. Appl. No. 10/245,476, mailed May 4, 2006.
Advisory Action for U.S. Appl. No. 10/336,523, mailed Mar. 26, 2007, 4 pages.
Board of Patent Appeals and Interferences Decision for U.S. Appl. No. 10/336,523 dated Sep. 9, 2009, 14 pages.
Examiner's Answer to Appeal Brief for U.S. Appl. No. 10/336,523, mailed Oct. 30, 2007, 11 pages.
Final Office Action for U.S. Appl. No. 10/336,523, mailed Jan. 4, 2007, 10 pages.
Non-Final Office Action for U.S. Appl. No. 10/336,523, mailed Jun. 2, 2006, 7 pages.
Notice of Allowance for U.S. Appl. No. 10/336,523, mailed Dec. 15, 2009, 6 pages.
First Office Action for Canadian Patent Application 2,447,767, mailed Jul. 10, 2012, 14 pages.
Advisory Action for U.S. Appl. No. 10/262,393, mailed May 4, 2005, 3 pages.
Final Office Action for U.S. Appl. No. 10/262,393, mailed Feb. 23, 2005, 6 pages.
Final Office Action for U.S. Appl. No. 10/262,393, mailed Jan. 25, 2008, 5 pages.
Final Office Action for U.S. Appl. No. 10/262,393, mailed Jul. 24, 2006, 6 pages.
Non-Final Office Action for U.S. Appl. No. 10/262,393, mailed Aug. 23, 2005, 5 pages.
Non-Final Office Action for U.S. Appl. No. 10/262,393, mailed Jan. 24, 2006, 6 pages.
Non-Final Office Action for U.S. Appl. No. 10/262,393, mailed Jul. 7, 2004, 4 pages.
Non-Final Office Action for U.S. Appl. No. 10/262,393, mailed Jul. 9, 2007, 7 pages.
Notice of Allowance for U.S. Appl. No. 10/262,393, mailed Feb. 23, 2009, 7 pages.
Supplemental Notice of Allowance for U.S. Appl. No. 10/262,393, mailed May 15, 2009, 3 pages.
Advisory Notice for U.S. Appl. No. 10/247,591, mailed Jan. 9, 2009, 6 pages.
Final Office Action for U.S. Appl. No. 10/247,591, mailed Jul. 14, 2006, 12 pages.
Final Office Action for U.S. Appl. No. 10/247,591, mailed Oct. 21, 2008, 14 pages.
Non-Final Office Action for U.S. Appl. No. 10/247,591, mailed Apr. 19, 2007, 12 pages.
Non-Final Office Action for U.S. Appl. No. 10/247,591, mailed Apr. 7, 2008, 13 pages.
Non-Final Office Action for U.S. Appl. No. 10/247,591, mailed Jan. 6, 2006, 11 pages.
Non-Final Office Action for U.S. Appl. No. 10/247,591, mailed Nov. 2, 2006, 12 pages.

(56) References Cited

OTHER PUBLICATIONS

Non-Final Office Action for U.S. Appl. No. 10/247,591, mailed Oct. 9, 2007, 11 pages.
Advisory Action for U.S. Appl. No. 10/325,144, mailed Mar. 5, 2007, 15 pages.
Final Office Action for U.S. Appl. No. 10/325,144, mailed Dec. 18, 2006, 12 pages.
Non-Final Office Action for U.S. Appl. No. 10/325,144, mailed Jul. 3, 2006, 8 pages.
Examiner's Answer to Appeal Brief for U.S. Appl. No. 10/723,808, mailed Dec. 22, 2010, 18 pages.
Final Office Action for U.S. Appl. No. 10/723,808, mailed Feb. 8, 2006, 12 pages.
Final Office Action for U.S. Appl. No. 10/723,808, mailed Mar. 29, 2010, 13 pages.
Final Office Action for U.S. Appl. No. 10/723,808, mailed May 6, 2009, 15 pages.
Final Office Action for U.S. Appl. No. 10/723,808, mailed Aug. 14, 2008, 15 pages.
Non-Final Office Action for U.S. Appl. No. 10/723,808, mailed Apr. 16, 2007, 13 pages.
Non-Final Office Action for U.S. Appl. No. 10/723,808, mailed Aug. 3, 2009, 12 pages.
Non-Final Office Action for U.S. Appl. No. 10/723,808, mailed Feb. 22, 2008, 13 pages.
Non-Final Office Action for U.S. Appl. No. 10/723,808, mailed May 9, 2006, 12 pages.
Non-Final Office Action for U.S. Appl. No. 10/723,808, mailed Nov. 12, 2008 14 pages.
Non-Final Office Action for U.S. Appl. No. 10/723,808, mailed Oct. 10, 2006, 12 pages.
Non-Final Office Action for U.S. Appl. No. 10/723,808, mailed Sep. 26, 2007, 12 pages.
Non-Final Office Action for U.S. Appl. No. 10/723,808, mailed Sep. 9, 2005, 14 pages.
International Search Report for PCT/IB2006/002542, mailed Feb. 28, 2007, 15 pages.
European Search Report for European Patent Application 03797454.0, mailed Nov. 12, 2011, 6 pages.

\* cited by examiner

TELEPHONY USAGE DERIVED PRESENCE INFORMATION

This application claims the benefit of U.S. Provisional Application No. 60/329,668, entitled TELEPHONY USAGE DERIVED PRESENCE STATE INFORMATION and filed Oct. 16, 2001.

FIELD OF THE INVENTION

The present invention relates to providing presence information, and in particular to automatically providing presence information from telephony systems in an automated fashion.

BACKGROUND OF THE INVENTION

Presence detection is a technology used to convey information about the availability of individuals. Individuals are often interested in the availability of others and, because they are often not co-located, they require mechanisms for conveying availability or status information. The devices that people interact with know bits and pieces about how available they are for communications or other forms of interaction with others at any instant. People who are on the phone are less available to most others for the duration of the call, but may want to be interrupted by selected callers.

The location of a person on a mobile phone is information that may be relevant for determining whether that person is available for a certain type of event. For example, someone traveling far away from home may not be available for physical interaction with their neighbors, but may be available to take a call. Similarly, someone near a particular restaurant at lunchtime is a potential consumer.

Presence related information is routinely generated in many devices connected to various networks. For example, a person using a Personal Computer (PC) attached to a network may generate various presence state information. An "On-line" state indicates a user has logged onto a network, such as the Internet or a corporate intranet, while an "Off-line" state indicates no connection is currently active between the user and the presence engine. "Idle" status implies the user's system, although logged on, has not been active recently. Similarly, a person Who acknowledges a calendar event in a PC or personal digital assistant (PDA) essentially signals their limited availability to most others for some duration while at the same time indicates that the person is active on that device. This level of presence indication is useful, but it is sufficiently coarse to limit its utility. Extension of these simple states is typically not automatic and usually requires direct, unnatural, user intervention.

The reliability and usefulness of presence information depends on the type of information provided and the device from which the information is gathered. A person actively interacting with a computer indicates to some degree that she is available, but probably only to those on the same network. A PC or other network device inside a corporate network will have visibility, independently or through a corporate presence server, to many presence inputs related to many PCs or other devices on that network. Typically, however, a device inside a corporate firewall will be isolated from having access to presence data related to devices like mobile phones, that by their very nature interconnect through commercial service provider networks.

Although PCs and other network devices can provide presence information, telephony use is a better indicator of a person's availability. Unfortunately, current presence systems are incapable of providing an efficient way of gathering information from PCs on proprietary networks as well as telephony use information.

The complications of involving devices from various networks supports the need for both a distributed architecture for presence information and the necessity for secure, trusted, presence related elements in the Internet to consolidate, filter, and distribute presence related information. Therefore, the presence data for an individual may involve several devices belonging to several networks of varying technologies. A central place having the potential to easily consolidate presence data is a device located in the Internet.

There is a need, therefore, for improving both the number and quality of inputs into a presence management system in order to more efficiently and effectively deliver presence information to users of the information. Given the significant use of mobile and wireless telephones, and the impact of such use on availability, there is a need to gather and use availability information associated with telephone usage for a presence system. There is a further need to automate gathering of availability information in a manner that does not rely upon active intervention.

Current presence technology standards and systems are provided for in references from the Internet Engineering Task Force (IETF). Presence technology protocol-related publications hereby incorporated by reference include: Day, M., Aggarwal, S. and Vincent, J., "Instant Messaging/Presence Protocol Requirements," Request for Comment (RFC) 2779, February 2000; Day, M., Rosenberg, J. and Sugano, H., "A Model for Presence and Instant Messaging," RFC 2778, February 2000; Rosenberg, J. and Schulzrinne, H., "SIP caller preferences and callee capabilities," (work in progress), November 2000; Crocker, D. et al., "A Common Profile for Instant Messaging (CPIM)," (work in progress), February 2001.

SUMMARY OF THE INVENTION

The present invention relates to a mechanism for providing state information, which bears on the presence of a telephone user, to a presence system. The state information is derived by monitoring events relating to telephony use. Once derived, the state information is directly or indirectly sent to a presence service, which provides presence information to applications or people requiring such information about the telephone user. The state information preferably bears on the presence, absence, or availability of the telephone user based on their interaction with a telephony device or function. In one embodiment, a telephony switching system is configured to monitor events associated with a telephony device or function and send messages to a presence service over a packet-switched network when the state of the telephony device or function changes. In another embodiment, an IP telephone system is configured to provide state information to the presence service.

In circuit-switched embodiments, the switching system may include traditional public switched telephone network (PSTN) devices as well as wireless switching devices to monitor events associated with the use of the telephony device to detect state changes. In packet-switched telephone systems, the telephony function may be provided in a separate device or as a part of a larger system that is capable of determining the state of the telephony use and notify the presence service of the same. Location information may be provided to the presence service along with the state information. The additional value of location information is clear when the telephony device or function is part of a mobile application, but is also to some degree useful even if the telephony device is typically in a constant location. To illustrate this point, consider the value of knowing if a person is talking on their office or their residential phone. Preferably, the state information is derived from monitoring events associated with normal telephony communication to minimize the impact of extracting presence information on the overall system.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
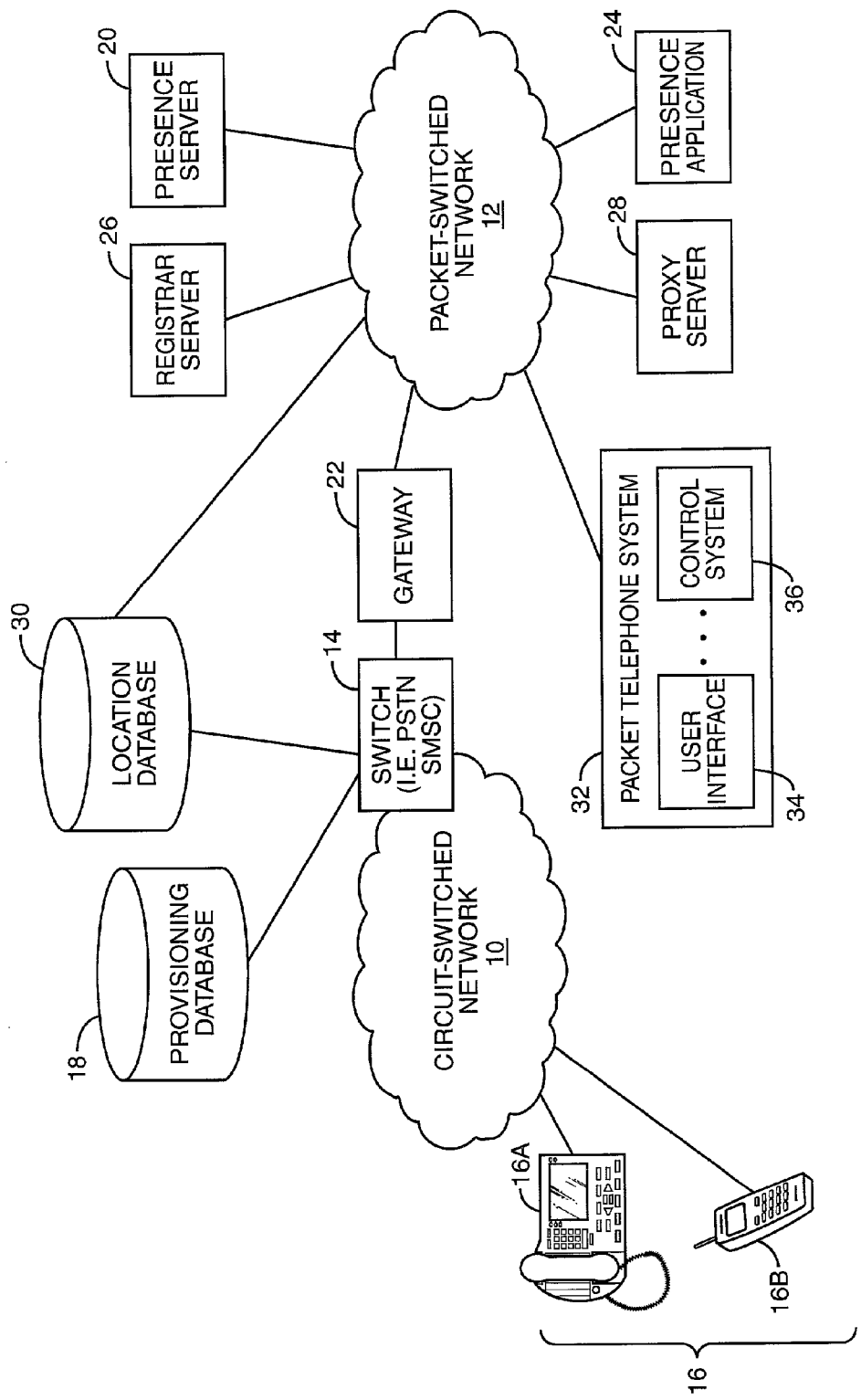
FIG. 1 is a block representation of a communication environment constructed according to one embodiment of the present invention.

With reference to FIG. 1, a communication environment, which is capable of automatically generating presence information in relation to telephony devices, is illustrated. The communication environment may include a circuit-switched network 10, such as the public switched telephone network (PSTN) or a cellular communication network, and a packet-switched network 12, such as the Internet, which supports packet-switched communications. The circuit-switched network 10 may include various types of switches to facilitate circuit-switched communications for landline or wireless communications. The circuit-switched network 10 supports communications with various types of telephony devices 16, such as a traditional landline telephone 16A or a mobile telephone 16B. In a wireless communication embodiment, the switches 14 cooperate with base stations (not shown), which facilitate wireless communications with mobile terminals, such as the mobile telephone 16B. Those skilled in the art will recognize the functionality of the switches 14 and other components in the circuit-switched network 10 to facilitate communications with the landline and wireless telephony devices 16.

The switch 14 is defined as being either an integrated device or multi-component system facilitating circuit-switched communication and including call server or call control functionality, which is traditionally provided in intelligent networks (IN), such as those implementing SS7 and the like. Typically, the switches 14 cooperate with a provisioning database 18, which provides information allowing a switch 14 to properly identify, locate, and provision the various telephony devices 16 in the circuit-switched network 10.

The present invention is particularly beneficial for delivering presence information, which may include the state of the telephony device 16, its location, or a combination thereof, directly or indirectly to a presence server 20, located on the packet-switched network 12. If necessary, a gateway 22 may be used to facilitate communications between the switch 14 and devices on the packet-switched network 12. The gateway 22 may facilitate any necessary protocol conversions required for communications between the switch 14 and devices on the packet-switched network 12.

The presence server 20 facilitates a presence service and operates to collect presence information for various devices of various users, process the presence information, and provide the presence information to presence applications 24, automatically or in response to a request. Each presence application 24 is associated with a user device (not shown), and provides alerts to the associated user based on presence information associated with other users and derived from the presence server 20. Preferably, the presence application 24 subscribes to the presence server 20 and identifies the users whose presence information is desired. The presence server 20 will accept these subscriptions as well as register participating users and their associated devices. The presence server 20 may also implement various presence delivery rules to allow users to control the dissemination of their presence information to other users. Notably, various profiles may be established to allow select groups of users to obtain more presence information than other groups. Accordingly, each registered user may implement filters or rules to control dissemination of their information to other users. In the converse, users subscribing to receive presence information of others may also establish profiles identifying the users whose presence information is desired and the types of presence information they wish to receive.

A registrar server 26 may be provided on the packet-switched network 12 to maintain a relationship between the logical and the physical addresses of devices that directly or indirectly communicate with the presence server 20. Such registration is typically required only when there is a change between the logical or user addresses and the physical addresses of a given device.

In one embodiment, the switch 14 is configured to provide presence information corresponding to the state, location, or a combination thereof associated with a telephony device 16 to the presence server 20. In this embodiment, it is preferable to provide a proxy server 28 to act as a liaison between the switch 14 and the presence server 20. As such, the switch 14 will provide presence information to the proxy server 28, which will represent the switch 14 to the presence server 20 in a traditional proxy fashion. Those skilled in the art will recognize that the proxy server 28 is optional.

The presence information provided to the presence server 20 from the switch 14 will depend on the application and the type of communication environment. For example, the traditional landline telephone 16A will not change location, and will typically provide location information only as a part of registration, and dynamically provide a mechanism to determine state information relating to its operation. For example, the switch 14 that serves the telephone 16A can determine whether the phone is on-hook or off-hook, and thus determine whether the user is engaged in a telephone call. More sophisticated systems may be able to determine whether the party is on a conference call, on hold, and whether any settings on the phone indicate that the user is in or out of the office. Accordingly, the state information gathered by the switch 14 in association with the operation of telephone 16A is used to create presence information to send to the presence server 20 via the proxy server 28.

For mobile terminals, such as the mobile telephone 16B, the servicing mobility switching center (SMSC), which is represented by switch 14, may gather all of the state information described above, as well as provide dynamic location information derived directly from the mobile terminal 16B or from the circuit-switched network 10. Accordingly, the state information for mobile devices may be supplemented with location information, which provides the presence server 20 the opportunity to distribute presence information to the various presence applications 24 based on dynamic location, if so desired. The location information may be provided by the mobile terminal, if equipped with location detection technology, such as that provided by the Global Positioning System (GPS), wherein the mobile terminal receives the GPS coordinates and may provide either the coordinates to the switch 14, which will determine the mobile terminal's location, or may process the GPS information to determine a location, which is then sent to the switch 14. Alternatively, triangulation techniques may be used to determine the mobile terminal's location, which may be stored in a location database 30 or like device. The location database 30 may be accessed via the switch 14 to obtain location information, or the location database 30 may be configured such that the presence server 20 or an associated device may directly access it via the packet-switched network 12.

Packet-based telephony devices, such as the packet telephone system 32, essentially emulate the operation of circuit-switched telephony devices 16 entirely over the packet-switched network 12. Thus, presence information associated with a fixed or mobile packet telephone system 32 may be configured to provide automated presence information including state information, and perhaps location information, to the presence server 20 directly or indirectly via a proxy server 28. The packet telephone system 32 will include a user interface 34 and a control system 36. As those skilled in the art will recognize, the packet telephone system 32 may be integrated into a single device, or may be implemented in multiple devices in a client-server configuration. For the latter case, the proxy server 28 may be further configured to support various operational features of the packet telephone system 32.

The user interface 34 may include a microphone and speaker to facilitate voice communications, as well as various keypads and displays to allow user interaction in traditional fashion. The control system 36 will operate to support the user interface 34 and provide the requisite functionality to enable the packet telephone system 32 to facilitate communications with other devices on the packet-switched network 12 directly or indirectly via the proxy server 28. For the purposes of description, assume that the control system 36 is capable of gathering and providing state information for the packet telephone system 32. In wireless environments, a wireless packet-switched network (not shown) is necessary to facilitate communications with the packet-switched network 12.

Although many communication protocols may be used to facilitate communications between the various devices on the packet-switched network 12 and the gateway 22 or switch 14, the Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 2543: Session Initiation Protocol Internet Draft, which is incorporated herein by reference in its entirety.

In general, a SIP proxy, such as may be provided by the proxy server 28, may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the switch 14, the registrar server 26, the presence server 20, the device running the presence application 24, and the like.

A SIP endpoint is generally capable of running an application, which is generally referred to as a user agent (UA), and is capable of facilitating media sessions using SIP. User agents register their ability to establish sessions with a SIP proxy, such as proxy server 28, by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

Figure 2:
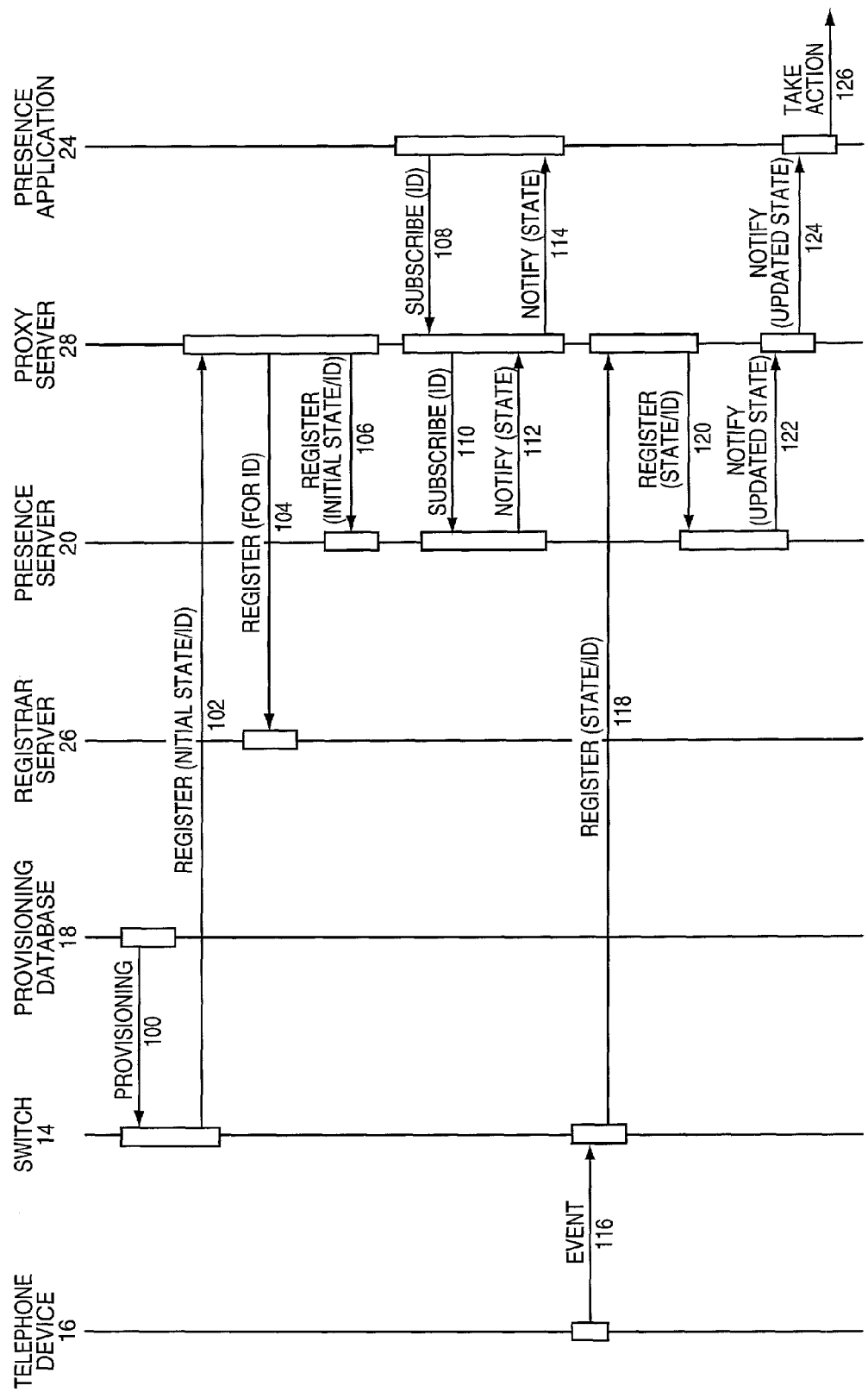
FIG. 2 is a communication flow diagram for an exemplary embodiment of the present invention.

An exemplary call flow for providing presence information relating to a telephony device 16 on the circuit-switched network 10 is illustrated in FIG. 2. Although the SIP protocol is used for illustration, those skilled in the art will recognize the general functionality of the described messages and their applicability to other protocols. The flow begins when a user initially requests activation of the telephony device 16 through a local exchange carrier or like entity, which controls access and communications for the telephony device 16.

Typically, the telephony device 16 is provisioned by providing provisioning information from the provisioning database 18 to the switch 14 (step 100). Preferably, the traditional provisioning information is supplemented with information indicating whether the user of telephony device 16 wishes to subscribe to the presence service provided by the presence server 20. Accordingly, the switch 14 will receive the provisioning information from the provisioning database 18 and provision the telephony device 16, as well as store information that correlates the relationship between the telephony device 16 and a presence ID, which is used by the presence server 20 for determining the state of the telephony device 16. The telephony device 16 is typically identified on the circuit-switched network 10 using a directory number, caller identification, or similar designation. Alternatively, a user may be able to dynamically provision a device from the device, without requiring the network operator to take action.

Once the provisioning of telephony device 16 is complete, the switch 14 will send a REGISTER message to the proxy server 28 (step 102). Preferably, the switch 14 registers as a user agent, and the proxy server 28 acts as a SIP proxy server. The REGISTER message effectively registers the ability of the switch 14 to provide presence information with the SIP proxy 28. In particular, the REGISTER message informs the proxy server 28 of the SIP URL that identifies the user agent of the switch 14 to the (SIP) packet-switched network 12. The REGISTER message may also contain information about how to reach the user agent over the packet-switched network 12, typically by providing the Internet Protocol (IP) address and port that the user agent will use for SIP sessions. Preferably, the REGISTER message will also include an initial state of the telephony device 16 and identification indicia for the telephony device 16. The identification indicia in a SIP environment is preferably a SIP ID, which is the logical address associated with the telephony device 16, as represented on the packet-switched network 12.

In response to this initial REGISTER message, the proxy server 28 will send a like REGISTER message to the registrar server 26 to register the telephony device 16 with the registrar server 26 (step 104). Further, the proxy server 28 may also forward the REGISTER message to the presence server 20 (step 106). At this point, the presence server 20 has registered the telephony device 16 and has associated an initial state for the telephony device 16.

The presence server 20 consolidates and/or transforms device data into the state associated with a logical or user identification and provides relevant state information to the presence application 24. Subsequently, the presence application 24 will subscribe to the presence service provided by the presence server 20 to receive notifications of state information or state changes relating to telephony device 16, or other devices relating to the state or availability of the user. Accordingly, the presence application 24 will send a SUBSCRIBE message, which includes identification information (SIP ID) of the telephony device 16, to the proxy server 28 (step 108), which will forward the SUBSCRIBE message to the presence server 20 (step 110). In response, the presence server 20 will use the SIP ID provided in the SUBSCRIBE message to identify the telephony device 16 for which state information is requested. Once the presence server 20 has determined the state of the telephony device 16, a NOTIFY message, including the state of the telephony device 16, is sent to the proxy server 28 (step 112), which forwards the NOTIFY message to the presence application 24 (step 114). At this point, the presence application 24 has subscribed to state changes associated with the telephony device 16 and has received the initial state of the telephony device 16. Thus, the presence application 24 may react as necessary in response to receiving the state information for the telephony device 16 and awaits state change notifications for the telephony device 16.

Assume that the telephony device 16 changes state, such as being placed on-hook, going off-hook, initiating a hold function, going out of service, initiating a service activation, or the like. In essence, any change of state will trigger an event, which is sent to the switch 14 in traditional fashion (step 116). In addition to normal processing of the event, the switch 14 will recognize that the telephony device 16 has been provisioned to alert the presence service of state changes, and will send a REGISTER message identifying the telephony device 16 (preferably using the SIP ID) and including the current state to the proxy server 28 (step 118), which represents the presence server 20 to the switch 14. Proxy server 28 will then send a REGISTER message to register the new state in association with the identified telephony device 16 with the presence server 20 (step 120). The presence server 20 will then process the state information associated with telephony device 16 and send a NOTIFY message, if necessary, to the proxy server 28 to provide the updated state information (step 122), which will forward the NOTIFY message to the presence application 24 (step 124), which can then take appropriate action based on the state information (step 126). As noted above, the state information may be associated with location information in an appropriately configured wireless communication system.

Those skilled in the art will recognize that the use of REGISTER messages is only one implementation. In general, the switch 14 or some other device that provides autonomous state change information can use a REGISTER message or some other undefined message to notify the presence service. If the presence server 20 subscribes to the information on the switch 14, which changes the role of the switch to that of a presence user agent, it would allow the use of NOTIFY messages to communicate the presence data to the presence server 20.

The switch 14 may be configured to provide a table, which correlates the identification of the telephony device 16 on the circuit-switched network 10 with a presence identity, which is preferably a SIP address or URL. Using this table, the switch 14 can identify state changes for the telephony device 16 and can send updated presence information indirectly or directly to the presence server 20. For example, assume that a user has subscribed to an automatic presence service from a cellular communication operator. Part of the service subscription process will provision a presence address and correlate it with a registered mobile telephone 16B, based either upon the mobile identification number, a SIM card identification, the telephone number, or like designation. Whenever the user's mobile telephone 16B is on and in reach of the mobile network, the home location register (HLR) is made aware of this fact as part of the normal course of cellular telephone operation. The HLR can register on-line status on behalf of the user's presence identification based on this information. As noted, the presence information may include location identification in addition to state information. Those skilled in the art will recognize the application of the present invention to both traditional time division multiplexing (TDM) switching systems and more recent innovations, such as IP public branch exchanges, or telephony clients, such as SIP user agents, H.323 endpoints, Microsoft NetMeeting, or real-time communication clients. Network resources, such as SIP proxies or H.323 gatekeepers, may also apply this technology if they retain call status information on the endpoints or user agents they manage.

Figure 3:
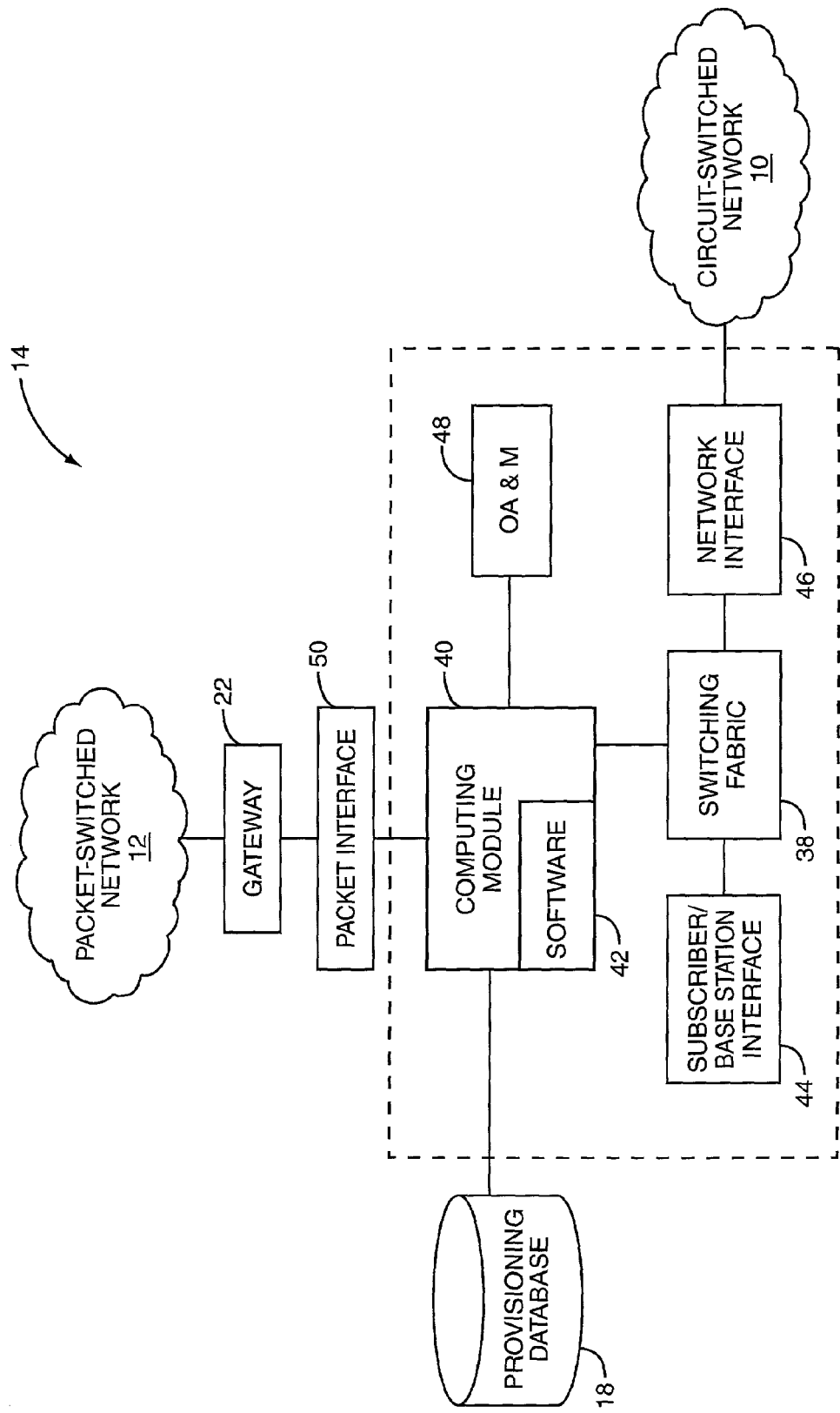
FIG. 3 is a block representation of a telephony switch constructed according to one embodiment of the present invention.

Turning now to FIG. 3, a block representation of a switch 14 is illustrated. The switch 14 is represented generically and is intended to cover the logical functionality of land-based and mobile switching systems, which include all control for call server-based functions. These switches may be implemented in a variety of ways using different equipment types, such as Nortel Networks Limited's DMS-100 local switching system. The switch 14 typically includes a switching fabric module 38, a computing module 40, including storage software 42, a subscriber/base station interface 44, a network interface 46, an operations/administration and maintenance (OA & M) module 48, and a packet interface 50. The switching fabric 38 may comprise logical and physical switches for interconnecting the subscriber/base station interface 44 with the remainder of the circuit-switched network 10 through the network interface 46. Depending on a land-based or wireless embodiment, the subscriber/base station interface 44 will either directly support subscribers through subscriber lines or will support base stations, which facilitate wireless communications with mobile devices. As illustrated, the computing module 40 controls circuit-switched communications via the switching fabric 38 and is capable of providing traditional intelligent network monitoring and functions. Further, the computing module 40 may cooperate with the provisioning database 18 as described above. As noted above, the functionality of the switch may be provided in various levels of integration.

In operation, the software 42 of the computing module 40 is modified to recognize state changes associated with supported telephony devices 16 and provide the state information via the packet interface 50 either directly or indirectly to the presence server 20 on the packet-switched network 12. As noted, the messages sent to the presence server 20 will include identification for the associated telephony device 16, relative state information, and perhaps location information derived from a mobile telephone 16B or from elsewhere in the system. Preferably, the computing module 40 will cooperate with the provisioning database 18 to store information indicating that the particular telephony device 16 is subscribing to the presence service and providing an address for sending state change messages directly or indirectly to the presence server 20.

Those skilled in the art will recognize improvements and modifications to the preferred embodiments of the present invention. All such improvements and modifications are considered within the scope of the concepts disclosed herein and the claims that follow.

What is claimed is:

1. A method for providing state information for a communication device to a presence service comprising:
   registering the communication device, the communication device having a presence identification;
   receiving usage information regarding the communication device;
   generating presence information of the communication device from the presence identification of the communication device and the usage information regarding the communication device;
   determining a state of the communication device based on the presence information; and
   notifying the presence service of the state of the communication device.

2. The method of claim 1 wherein the step of registering further comprises sending a registration message including a current state of the communication device and the presence identification to the presence service.

3. The method of claim 1 wherein the communication device also has a telephone network identification and further comprising provisioning the telephony device using the telephone network identification to notify the presence service of the state of the telephony device using the presence identification.

4. The method of claim 1 wherein the step of notifying occurs upon a change in the usage information regarding the communication device.

5. The method of claim 1 wherein the step of determining the state of the communication device further comprises identifying an occurrence of an event in association with the communication device over a telephony network.

6. The method of claim 5 wherein the event is a telephony event defined in a telephony protocol for a public switched telephone network.

7. The method of claim 5 wherein the event is a telephony event defined in a telephony protocol for a wireless communication network.

8. The method of claim 1 further comprising determining location indicia bearing on the location of the communication device and notifying the presence service of the location indicia of the communication device.

9. The method of claim 8 wherein the location indicia is provided to the presence service with the state of the communication device.

10. The method of claim 1 where the communication device is a circuit-switched device and the notifying step further comprises sending a message to the presence service over a packet-switched network.

11. The method of claim 1 wherein the communication device is a packet-switched device and the notifying step further comprises sending a message to the presence service over a packet-switched network.

12. A system for providing state information pertaining to usage of a communication device to a presence service on a packet-switched network comprising:
   a) a first interface facilitating communications with the presence service over the packet-switched network;
   b) a communication device having a presence identification that correlates to a communication function; and
   c) computing logic associated with the first interface and adapted to:
      i) register the communication device with the presence service using the presence identification;
      ii) receive usage information regarding the communication device;
      iii) generate presence information of the communication device from the presence identification of the communication device and the usage information regarding the communication device;
      iv) determine a state of usage of the communication device based on the presence information; and
      v) notify the presence service of the state of usage of the communication device.

13. The system of claim 12 wherein the computing logic is further adapted to register the communication device by sending a registration message including a current state of the communication device and the presence identification to the presence service.

14. The system of claim 12 wherein the computing logic is further adapted to notify the presence service upon a change in the usage information regarding the communication device.

15. The system of claim 12 wherein the computing logic is further adapted to determine the state of the communication device by identifying an occurrence of an event in association with the communication device.

16. The system of claim 12 wherein the computing logic is further adapted to determine location indicia bearing on the location of the communication device and notify the presence service of the location indicia of the communication device.

17. The system of claim 16 wherein the location indicia is provided, to the presence service with the state of the communication device.

18. The system of claim 12 wherein user presence bears on presence, absence, or availability of a user in relation to the communication device.

19. The method of claim 1 wherein the presence service provides information relating to the state of the communication, device to an application associated with a user.

20. The system of claim 12 wherein the presence service provides information relating to the state of the communication device to an application associated with a user.

21. The method of claim 1 wherein the notifying occurs upon a change in the generated presence information.

22. The method of claim 1 wherein the notifying occurs upon a change in the determined state.

23. The method of claim 1 wherein the generating of the presence information occurs upon a change in the usage information regarding the communication device.

24. The method of claim 23 wherein the determining a state of the communication device occurs upon a change in the generated presence information.

25. The method of claim 24 wherein the notifying, occurs upon a change in the determined state.

26. The method of claim 1 wherein the usage information is received from the communication device.

27. The method of claim 1 wherein the usage information is received from a node in communication with the communication device.

28. The method of claim 1 wherein the state of the communication device is indicative of user presence.

29. The method of claim 28 wherein the user presence bears on at least one of presence, absence and availability of the user in relation to the communication device.

30. The method of claim 1 wherein the generating of the presence information comprises identifying an occurrence of an event in association with the communication device over a network.

31. The method of claim 1 wherein the receiving step occurs at a node in communication with the communication device; and wherein the generating step is performed by the node.

\* \* \* \* \*